Figure 1:
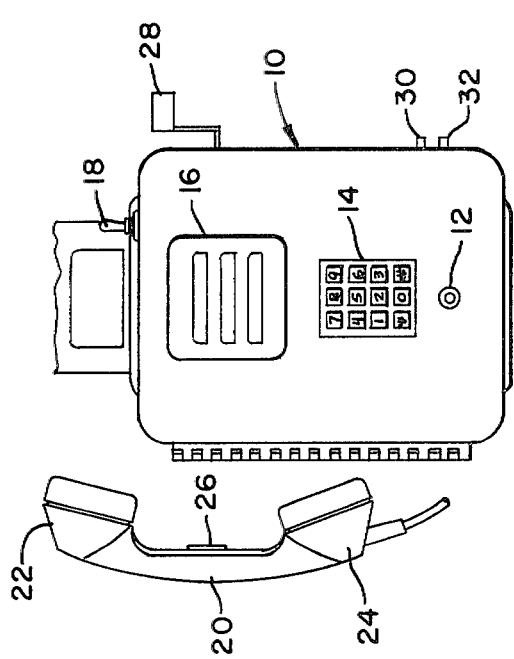

United States Patent [19]

Heller et al.

[11] 4,258,230
[45] Mar. 24, 1981

[54] PARTY LINE TELEPHONE SYSTEM

[75] Inventors: Herbert Heller, Pittsburgh; Paul W. Schmitt, Cheswick, both of Pa.

[73] Assignee: Mine Safety Appliances Company, Pittsburgh, Pa.

[21] Appl. No.: 48,911

[22] Filed: Jun. 15, 1979

[51] Int. Cl.³ .............................................. H04M 9/02
[52] U.S. Cl. .............................. 179/17 A; 179/18 BF; 179/37; 179/84 SS
[58] Field of Search ................. 179/1 H, 17 A, 17 E, 179/37, 84 R, 84 SS, 84 A, 18 BF

[56] References Cited

U.S. PATENT DOCUMENTS

| | | | |
|---|---|---|---|
| 3,336,444 | 8/1967 | Piechocki | 179/84 SS |
| 3,542,968 | 11/1970 | Mercer | 179/18 BF |
| 3,668,317 | 6/1972 | Vitalo | 179/18 BF |
| 3,859,475 | 1/1975 | Wulfsberg et al. | 179/2 EB |
| 3,909,547 | 9/1975 | Day | 179/18 BF |
| 3,912,875 | 10/1975 | Katz | 179/2 EB |
| 4,006,316 | 2/1977 | Bolgiano | 179/84 R |
| 4,037,059 | 7/1977 | Stine | 179/84 SS |

*Primary Examiner*—Gerald L. Brigance
*Attorney, Agent, or Firm*—Thomas H. Murray

[57] ABSTRACT

A party line telephone system capable of effecting selective calling from one station to another and particularly adapted for use in battery-powered two-wire telephone systems such as those used in underground mines where consideration of intrinsic safety, low power consumption and compatibility with existing equipment are paramount. The system of the invention is such that the receiver at each station in the network need not be connected to a battery-powered source for any prolonged period of time except when that station is being called by another station for a private conversation, thereby conserving battery power.

8 Claims, 3 Drawing Figures

PARTY LINE TELEPHONE SYSTEM

BACKGROUND OF THE INVENTION

While not limited thereto, the present invention is particularly adapted for use in two-wire party line telephone communication systems such as those used in underground mines and other similar installations. In the past, the individual stations in a system of this sort were each provided with a page switch and a loudspeaker. Communication was established between two stations by actuating the page switch and paging a particular individual after depressing a push-to-talk switch on a telephone handset, this page message being broadcast from every speaker at each station in the system. In response to the page, the called party would depress a push-to-talk switch on his handset, whereupon communication was established.

SUMMARY OF THE INVENTION

In accordance with the present invention, a telephone system of the general type described above is provided wherein communication can be established between two selected stations without the necessity for a page message being broadcast from every loud-speaker in the system. Among other things, this conserves battery power. When the user wishes to place a selective call to another station in the system of the invention, he picks up the handset, pushes a call button and makes three entries on a keyboard. These three entries describe the number he is calling and the operation (i.e., function) he wants the called station to perform such as actuation of an audible ring or some other indicator which will signal that the station is being called.

The calling station electronics transmits a train of pulses over the lines of the telephone system in response to the three entries on the keyboard. The first pulse in this train of pulses comprises a "wake-up" pulse that is discretely long. At each other station in the telephone system, a receiver is momentarily powered (i.e., connected to its battery power source). If noise pulses should be present that are longer or shorter than the "wake-up" pulse, the electronics incorporated into each station will reject them and return to the power-off state. However, upon receipt of a proper "wake-up" pulse, a decoding circuit is enabled that will accept a certain pattern of proper length pulses. The pattern is broken up into three identical parts comprising the most significant digit of the station being called, the least significant digit of the station being called, and a function that the received station is to perform.

Alternatively, if it is desired to page all stations in the telephone system, a page switch can be actuated as in prior art systems and communication established with every station in the system.

Figure 3:
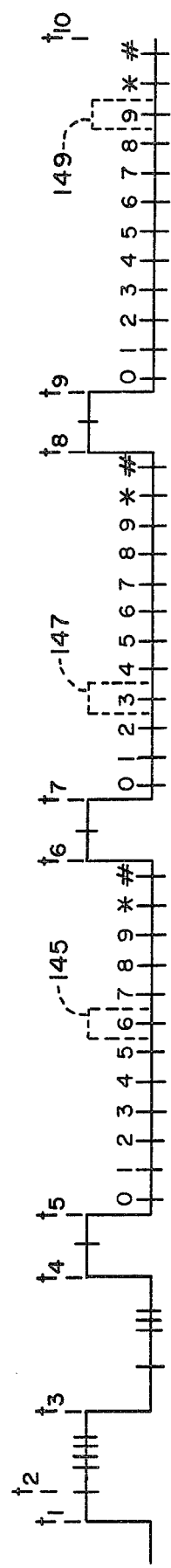
Figure 2:
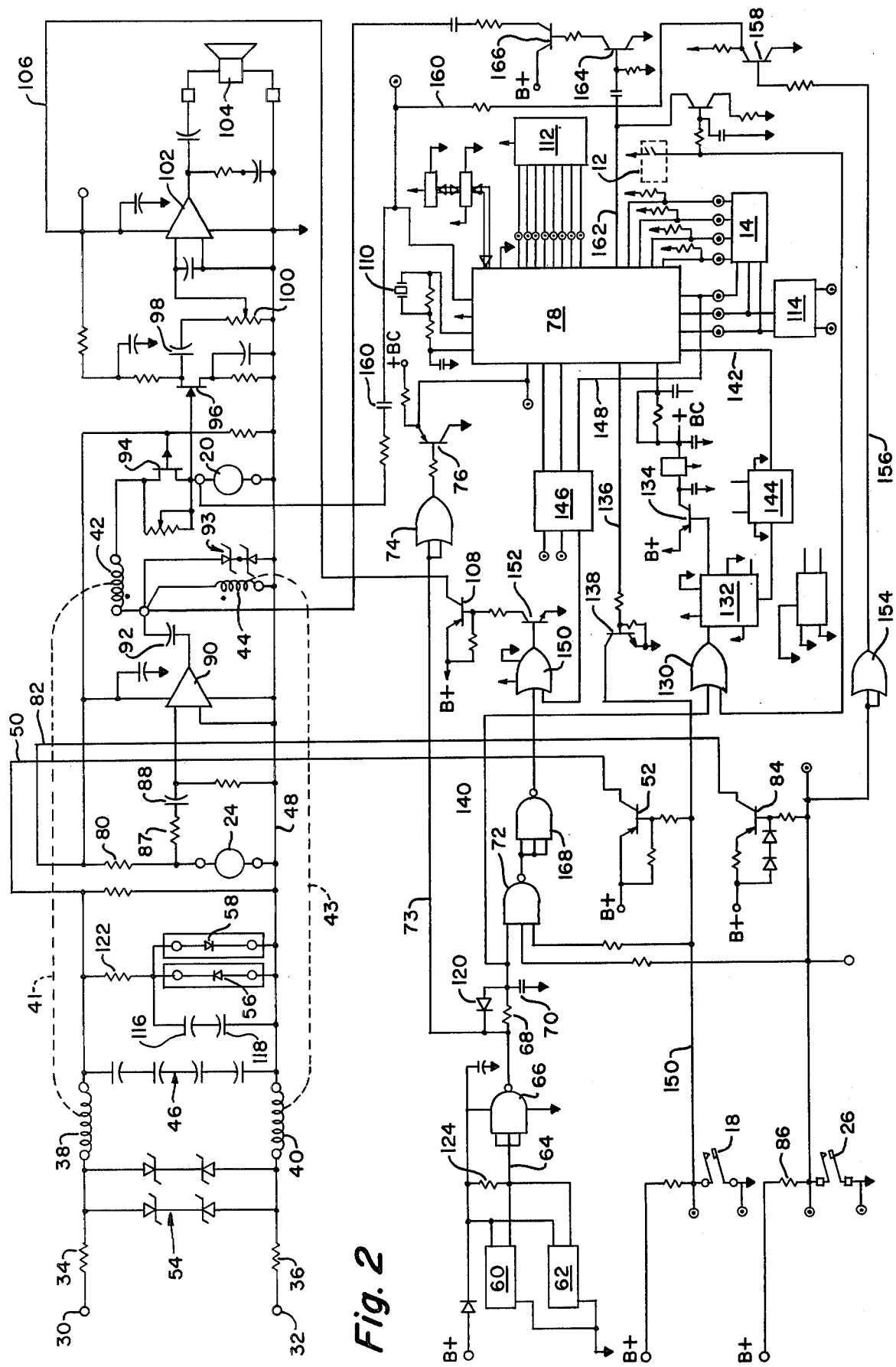

The above and other objects and features of the invention will become apparent from the following detailed description taken in connection with the accompanying drawings which form a part of this specification, and in which:

FIG. 1 is an illustration of a telephone station and handset which can be utilized in the present invention;

FIG. 2 comprises a schematic circuit diagram of the electronic circuitry incorporated into each station of a telephone system, the respective stations being interconnected by two conductors; and FIG. 3 comprises a waveform illustrating the transmit signal code utilized in accordance with the invention.

With reference now to the drawings, and particularly to FIG. 1, each station in the telephone system of the invention includes an enclosure 10 which contains electronic circuitry about to be described in connection with FIG. 2. On the face of the enclosure 10 is a manually-operated call button 12 as well as a pushbutton panel 14. Above the panel 14 is a slotted cover 16 behind which a loud-speaker is positioned. On top the enclosure 10 is an all-page switch 18 which may be actuated to audibly page all other stations in the telephone system via their loud-speakers.

The handset 20 includes the usual receiver 22, a transmitter or microphone 24, and a push-to-talk switch 26 which, as will be seen, must be actuated in order to establish communication with another station. In the particular embodiment of the invention shown in FIG. 1, a flag 28 is pivotally carried at the side of the enclosure 10 and may, for example, be actuated to change from a horizontal to a vertical position whenever the station in question is being called. Alternatively, a bell may be actuated to produce a ring signal as is the case with conventional telephones; or any other indicator may be utilized to apprise a party at a particular station that he is being called. Projecting outwardly from the side of the enclosure 10 are two telephone line terminals 30 and 32 adapted to be connected to two wires which are, in turn, connected to every other station in the telephone system.

With reference now to FIG. 2, the two terminals 30 and 32 are each connected through a resistor 34 or 36 to one end of a winding 38 or 40 which is inductively coupled to a winding 42 or 44 in the receive-transmit portion of the circuitry as indicated by the broken lines 41 and 43. The opposite ends of windings 38 and 40 are interconnected through series capacitors 46. Additionally, the other end of winding 40 is connected to a common or grounded lead 48; while the other end of winding 38 is connected through lead 50 to the collector of transistor 52 which has its emitter connected to a B+ battery voltage source, not shown. As will be seen, transmitter 52 will be triggered into conduction to connect winding 38 to a source of positive potential when the all-page switch 18, also shown in FIG. 1, is closed.

Connected in shunt with the capacitors 46 are Zener diodes 54 which will shunt excessive current surges. Also connected in shunt with the capacitors 46 are two light-emitting diodes 56 and 58 incorporated into bipolarity optical couplers. Light from the diodes 56 and 58 is detected by detectors 60 and 62; and the light so detected is converted into pulses on lead 64 which are applied to a NAND circuit 66. the output of the NAND circuit 66, in turn, is applied through an RC network, comprising resistor 68 and capacitor 70, to one input of a second NAND circuit 72. The pulses at the output of circuit 66 are also applied through lead 73 and OR circuit 74 to the base of transistor 76. These pulses are then coupled through the emitter of transistor 76 to one input terminal of a microprocessor, generally indicated by the reference numeral 78 in FIG. 2.

One side of the microphone or transmitter 24 is connected to the grounded lead 48; while the other side is connected through resistor 80 and lead 82 to the collector of transistor 84. The emitter of transistor 84 is connected to the B+ voltage source; while its base electrode is connected to the B+ voltage source through resistor 86 such that the transistor normally does not conduct. When, however, the push-to-talk switch 26 is depressed, transistor 84 conducts and the transmitting portion of the system, including the transmitter 24, is energized. The ungrounded terminal of transmitter 24 is connected through resistor 87 and capacitor 88 as shown to an audio amplifier 90, the output of which is coupled through capacitor 92 to the windings 42 and 44 which, as mentioned above, are inductively coupled to windings 38 and 40, respectively. Voice signals from the transmitter 24 are thus coupled to the telephone line terminals 30 and 32 via windings 38–44; while the speaker's voice at the station shown and any incoming signals are applied through field-effect transistor 94 to the receiver 22 in the handset 20 shown in FIG. 1. Zener diodes 93 in shunt with the winding 44 act as surge voltage limiting devices. The incoming audio signal is also coupled through field-effect transistor 96, capacitor 98 and volume-control potentiometer 100 to a speaker amplifier 102, the output of which is applied to a speaker 104 which is behind the plate 16 shown in FIG. 1. Power to the speaker amplifier 102 is supplied via lead 106 which is connected to the collector of transistor 108 having its emitter connected to the B+ battery voltage source as shown. The transistor 108 is normally non-conducting but will be turned ON to connect the speaker to the power source in a manner hereinafter described.

The microprocessor 78 in FIG. 2 is connected to a timing crystal 110 which supplies the basic timing pulses to the system. Additionally, the phone number of the station shown is stored via switch position in 112, also connected to the microprocessor 78. The keyboard 14, also shown in FIG. 1, is coupled to the microprocessor 78 as well as a level translator 114.

Reverting again to the telephone input terminals 30 and 32 in FIG. 2, short pulses received on the line AC pulses are bypassed from the optical coupler (i.e., light-emitting diodes 56 and 58) by capacitors 116 and 118. Longer pulses of either polarity are sensed as an output of the coupler receivers 60 and 62 and change the state of NAND circuit 66 which acts as a pulse receiver. If the pulse persists for a long enough time as determined by the RC network 68, 70, a "wake-up" signal is established. This "wake-up" signal must persist since otherwise the capacitor 70 will discharge in a about time via the diode 120 in shunt with resistor 68. The required input voltage level of the pulse detector is determined by the optical coupler diode input voltage conduction range, the series resistor 122 and the coupler current transfer characteristics into its load comprising resistor 124. The combination just described represents a high impedance to the input terminals 30 and 32 and virtually no internal battery drain will occur until a proper "wake-up" pulse is established. Alternating current voltages such as audio and/or power line pickup are bypassed. As a result, no system power is consumed in the idle state.

The operation of the system in establishing communication between selected stations in the system can best be understood by reference to FIG. 3. At time $t_1$, for example, it will be assumed that a "wake-up" pulse has been transmitted from one station in the telephone system. With reference again to FIG. 2, this pulse is produced by depressing the call pushbutton 12 which, through OR circuit 130, triggers a flip-flop 132 to actuate transistor 134 to turn ON the microprocessor 78. The microprocessor 78 at the calling station, when turned ON, produces a pulse on lead 136 which, through transistor 138, turns ON transistor 52 between times $t_1$ and $t_3$ shown in FIG. 3, thereby producing the "wake-up" pulse which is impressed on the output terminals 30 and 32. At all other stations in the system, the "wake-up" pulse is sensed by the optical couplers 56, 58 and 60, 62, thereby producing a signal on lead 140 which, through the OR circuit 130 at each station in the system, triggers the flip-flop 132 to supply power to the microprocessor 78 in those stations. Thus, the microprocessor is turned ON at the calling station by the pushbutton switch 12 at that station, but is turned ON at all other stations by a received "wake-up" pulse. At time $t_2$ shown in FIG. 3, the microprocessor begins to sample for a signal from transistor 76 at a 4.5 millisecond rate. That is, it samples to determine whether the input to the microprocessor is grounded via the transistor 76. Maximum sample duration is about 350 milliseconds. If, in this period, a low (i.e., ground) signal from transistor 76 is not found, a signal is produced on lead 142 which, through level translator 144, triggers or resets flip-flop 132 to remove power from the microprocessor 78. At time $t_4$ shown in FIG. 3, the signal from a transmitting station will again rise. This is sensed as an input from transistor 76 by the microprocessor 78; however if it is not sensed, the microprocessor 78 automatically turns OFF in the manner previously described (by resetting flip-flop 132). Between times $t_5$ and $t_6$, the microprocessor samples incoming pulses from the sending station to determine whether it is being called by that station. In the illustration given, the most significant digit of the telephone number of the station being called is six as represented by broken-line pulse 145. Accordingly, any micro-processor for a station which does not have six as the most significant digit in its telephone number will automatically turn OFF by resetting its flip-flop 132. At time $t_6$, a second synchronizing pulse occurs; and if this is not sensed by the microprocessor it will again turn OFF. Between times $t_7$ and $t_8$, a search is made for the least significant digit of the telephone number; and again, even though the most significant digit of the telephone number of a station is six in the example given, if its least significant digit is anything but three, the microprocessor will turn OFF. In the example given, the least significant digit is three as represented by broken-line pulse 147. The result, of course, is that the only micro-processor in the system which will remain ON after the sampling process is that having the telephone number "63" which is being called by another station in the system. At time $t_8$, another synchronizing pulse occurs; and between times $t_9$ and $t_{10}$ a search is made for a function signal which may, as explained above, call for a ring tone, a flag or possibly a light. In the example given, it will be assumed that the pulse 149 in the ninth location between times $t_9$ and $t_{10}$ is calling for a ring.

When the ring or visual indication occurs at the called station, the called party will pick up his handset and depress his push-to-talk switch 26, whereupon the audio amplifier 90 is powered and communication is established between the two stations.

It will be noted in FIG. 2 that there is connected to the microprocessor 78 a second level translator 146. A signal from the microprocessor 78 on lead 148 can be applied through the level translator 146 to the input of OR circuit 150. The signal applied to OR circuit 150, in turn, will turn ON transistor 152 to ground the base of transistor 108, thereby connecting the B+ voltage source to lead 106 to power the speaker amplifier 102. The foregoing sequence occurs when the function pulse between times $t_9$ and $t_{10}$ shown in FIG. 3 commands the microprocessor at the receiving station to power its loud-speaker in order that the receiving station will hear the caller from the loud-speaker.

When the push-to-talk switch 26 is depressed, a signal is applied through OR circuit 154 to lead 156 which, in turn, is connected to the base of transistor 158. When this occurs, lead 160 becomes grounded to signal the microprocessor at the sending station that the function is acknowledged.

When communication has been established between a sending and a receiving station, the microprocessor 78 at the receiving station will produce a signal on lead 162 which, through transistors 164 and 166 generates a "beep" which is transmitted back through the coils 42 and 38 and 40 to the sending station to indicate to the caller at the sending station that communication has been established.

When it is desired to page all stations rather than establish communication with a selected station, the all-page switch 18 is closed to ground lead 150. This triggers NAND circuit 72 to apply a low or grounded signal via inverter 168 and OR circuit 150 to a base of transistor 152. As a result, the transistor 108 is turned OFF and power is not supplied to the speaker amplifier 102 at the sending station. At the receiving stations, the direct current signal detected by the light-emitting diodes 56 and 58 generates a signal at the output of circuit 66 which, through circuits 72, 168 and 150 renders transistor 152 conducting to supply power to speaker amplifier 102 through lead 106. Hence, under these conditions, all speakers in the system except the calling station are powered and the voice emanating from the sending station will be heard at every other station in the system.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In a telephone communication system, a plurality of telephone stations interconnected by a single pair of electrical conductors, transmitting and receiving means at each of said stations, individual normally-off microprocessor means associated with each of said stations, means at each of said stations for impressing on said conductors a wake-up pulse followed by a pulse train identifying another station to be called, means at each station responsive to the wake-up pulse for connecting a source of electrical power to the microprocessor means at that station, means in the microprocessor means at each station for comparing said pulse train with a code identifying its associated station, and means for returning the microprocessor to an off condition if the pulse train does not match the said identifying code.

2. The system of claim 1 wherein said transmitting and receiving means at each station are normally unpowered, and means in said microprocessor means for powering said receiving means at a station only when the microprocessor means establishes from said pulse train that that station is being called.

3. The system of claim 1 wherein said pulse train includes a series of pulses whose spacing identifies a station being called.

4. The system of claim 1 wherein pulses are detected at each station by an optical coupler.

5. The system of claim 4 wherein said optical coupler is connected in shunt with capacitor means which by-passes pulses below a predetermined width as well as alternating currents.

6. The system of claim 1 wherein the microprocessor means at each station is powered in response to the leading edge of said wake-up pulse, and wherein the microprocessor means will disconnect itself from said source of electrical power except when said wake-up pulse persists for a predetermined period of time.

7. The system of claim 6 including a flip-flop which changes stable states to power said microprocessor means in response to said leading edge of the wake-up pulse, the flip-flop being reset to remove power from the microprocessor means in response to a signal from the microprocessor means.

8. The system of claim 1 wherein a pulse in said pulse train actuates an indicator at a called station to indicate that it is being called.

* * * * *